US012558949B2

(12) United States Patent　　　　(10) Patent No.: US 12,558,949 B2
Cattoor et al.　　　　　　　　　　　(45) Date of Patent: Feb. 24, 2026

---

(54) METHODS AND SYSTEMS FOR TRANSMISSION AND MOTORS

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE); Bert Hannon, Bruges (BE); Joachim Van Dingenen, Drongen (BE)

(73) Assignee: DANA BELGIUM, Bruges (BE)

( * ) Notice: Subject to any disclaimer, the term of this patent is extended or adjusted under 35 U.S.C. 154(b) by 333 days.

(21) Appl. No.: 18/189,836

(22) Filed: Mar. 24, 2023

(65) Prior Publication Data

US 2023/0356581 A1　　　Nov. 9, 2023

Related U.S. Application Data

(60) Provisional application No. 63/364,178, filed on May 4, 2022.

(51) Int. Cl.
　　B60K 6/26　　　　(2007.10)
　　B60K 1/02　　　　(2006.01)
　　B60K 17/16　　　(2006.01)

(52) U.S. Cl.
　　CPC ................. B60K 6/26 (2013.01); B60K 1/02 (2013.01); B60K 17/16 (2013.01)

(58) Field of Classification Search
　　CPC .. B60K 6/26; B60K 1/02; B60K 17/16; F16H 3/089; F16H 2003/0818; F16H 2200/0021; F16H 2200/0034; Y02T 10/62
　　See application file for complete search history.

(56) References Cited

U.S. PATENT DOCUMENTS

| | | | | |
|---|---|---|---|---|
| RE38,017 E | * | 3/2003 | Yamaguchi | B60K 17/04 903/910 |
| 9,849,772 B2 | * | 12/2017 | Takami | B60K 6/36 |
| 2011/0139522 A1 | | 6/2011 | Takenaka et al. | |
| 2015/0151627 A1 | * | 6/2015 | Kato | B60K 6/547 903/910 |
| 2015/0176687 A1 | | 6/2015 | Smetana et al. | |
| 2015/0292606 A1 | | 10/2015 | Lübke et al. | |
| 2021/0229542 A1 | * | 7/2021 | Lehmann | B60K 6/24 |
| 2022/0176798 A1 | * | 6/2022 | Beck | B60K 6/387 |
| 2022/0274479 A1 | * | 9/2022 | Beck | B60K 6/40 |
| 2022/0355657 A1 | * | 11/2022 | Kawamoto | B60K 6/40 |
| 2023/0101199 A1 | * | 3/2023 | Brilka | F16H 61/0403 180/242 |
| 2024/0198783 A1 | * | 6/2024 | Lehmann | B60K 6/40 |

FOREIGN PATENT DOCUMENTS

DE　　102018128367 A1　　5/2019
DE　　202019103781 U1　　10/2020

* cited by examiner

*Primary Examiner* — Farhana Pervin
(74) *Attorney, Agent, or Firm* — McCoy Russell LLP

(57) ABSTRACT

Methods and systems are provided for a transmission. In one example, the transmission includes electric motor arranged on both sides thereof. In at least one example, electric motors on opposite sides of the transmission are coupled to a single input shaft.

19 Claims, 2 Drawing Sheets

METHODS AND SYSTEMS FOR TRANSMISSION AND MOTORS

CROSS REFERENCE TO RELATED APPLICATION

The present application claims priority to U.S. Provisional Application No. 63/364,178, entitled "METHODS AND SYSTEMS FOR TRANSMISSION AND MOTORS", and filed on May 4, 2022. The entire contents of the above-listed application are hereby incorporated by reference for all purposes.

TECHNICAL FIELD

The present description relates generally to a transmission comprising a countershaft configuration and a plurality of motors coupled to both sides thereof.

BACKGROUND AND SUMMARY

Vehicles, such as highway vehicles or off-highway vehicles, may have a transmission assembly. The transmission assembly may contain a plurality of shafts and reduction sets used for increasing the torque and decreasing the speed from rotational energy transferred by mover, such as an electric machine. Shafts and outputs of reduction sets may be set to realize different speeds and torques for different gear modes. There may be a plurality of movers such as electric machines used to drive the vehicle and transfer rotational energy through the transmission assembly.

Available space for a transmission in various applications may be limited as manufacturers continue to decrease the packaging footprint. The space requirements for a transmission of a rotor can be constrained compared to other vehicles, due to the increase compactness of the vehicle for maneuvering. Features such as a long drop to house and short flange-to-flange distances between shafts, reduction sets, may be incorporated to increase the compactness and decrease the volume of the transmission assembly. However, the use of a single motor, such as an electric machine, and or another mover may not be able to provide enough power and utility for different operations of the vehicle. For example, single mover or a planetary gear reduction sets designed for a more compact transmission may not provide the same output and performance when driving the vehicle, such as a loader, in a reverse direction compared to a forward direction. For another example, a single motor may be unable to provide a loader type of vehicle with the tractive effort at a stall to load a loading implement. In yet another example, a single motor may not be able to provide a requested top speed or a speed to climb a ramp. Power may be lost due to drag losses when utilizing a single motor. Additionally, a planetary gear system may be less effective in a more compact space, as the radial nature of the planet gears may not be able to take advantage of the space provided via the long drop.

The inventors herein have recognized potential issues with the above system. For example, the issues described above may be addressed via a transmission incorporating a countershaft 2-speed transmission that may be driven by a plurality of electric motors, including for example three motors. The transmission contains a countershaft with a first shaft and a second shaft capable of realizing two different speeds when the same rotational energy is transferred into their respective gear sets. The three motors may be electric machines of the same type and dimensions.

The countershaft arrangement and motor inputs may allow for the transmission to be shape fit for compactness, wherein the transmission may incorporate a long drop and a short flange-to-flange distance. The short flange to flange distance of the flanges on opposite ends of the output shaft may allow the output shaft to be compact enough to be incorporated into the space of the loader. Likewise, the three motors may be of smaller size and produce less power, however collectively may provide higher power to complete functions of the vehicle, such as providing enough top speed and or speed to move drive up a ramp.

In another example, a system for addressing at least some of the above issues comprises a transmission comprising a first input shaft and a second input shaft; a first electric motor coupled to the first input shaft; and a second electric motor and a third electric motor coupled to the second input shaft, wherein the second electric motor is arranged on a first side of the transmission and the third electric motor is arranged on a second side of the transmission, the first side opposite the second side.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where.

DETAILED DESCRIPTION

The following description relates to systems and methods for a two-speed power shaft that is powered by three electric motors. More specifically, three electric motors that are arranged with two on one face and one on another face opposite the first two, each of which contain speed reducer ratios. Two of the motors may be electric machines that are drivingly coupled to a first input shaft. One of the motors may be an electric machine drivingly coupled to a second input shaft. The electric machines and input shafts may be part of a larger assembly formed of a first subassembly and a second subassembly. Other shafts include an idle shaft, a first shaft, a second shaft, and an output shaft that may be drivingly coupled to the first and second input shaft via an idle gear. The input shafts, electric machines coupled to the input shafts, idle shafts, and the respective gears of the input and idle shafts may form the first subassembly. The first shaft, second shaft, output shaft, and the respective gears of each of these shafts may form the second subassembly.

The first shaft may form a first reduction set with respective gears and gears on the second shaft. The first reduction set may be formed by selectively coupling via a first clutch. The second shaft may form a second reduction set with respective gears and gears drivingly coupled to the first shaft. The second reduction set may be formed by selectively coupling via a second clutch. The first reduction set may be of a lesser ratio and produce a lesser torque and higher rotational speed compared to the second reduction set at the output shaft. Each of the shafts, clutches, and respective gears may be arranged in a countershaft configuration.

Figure 1:
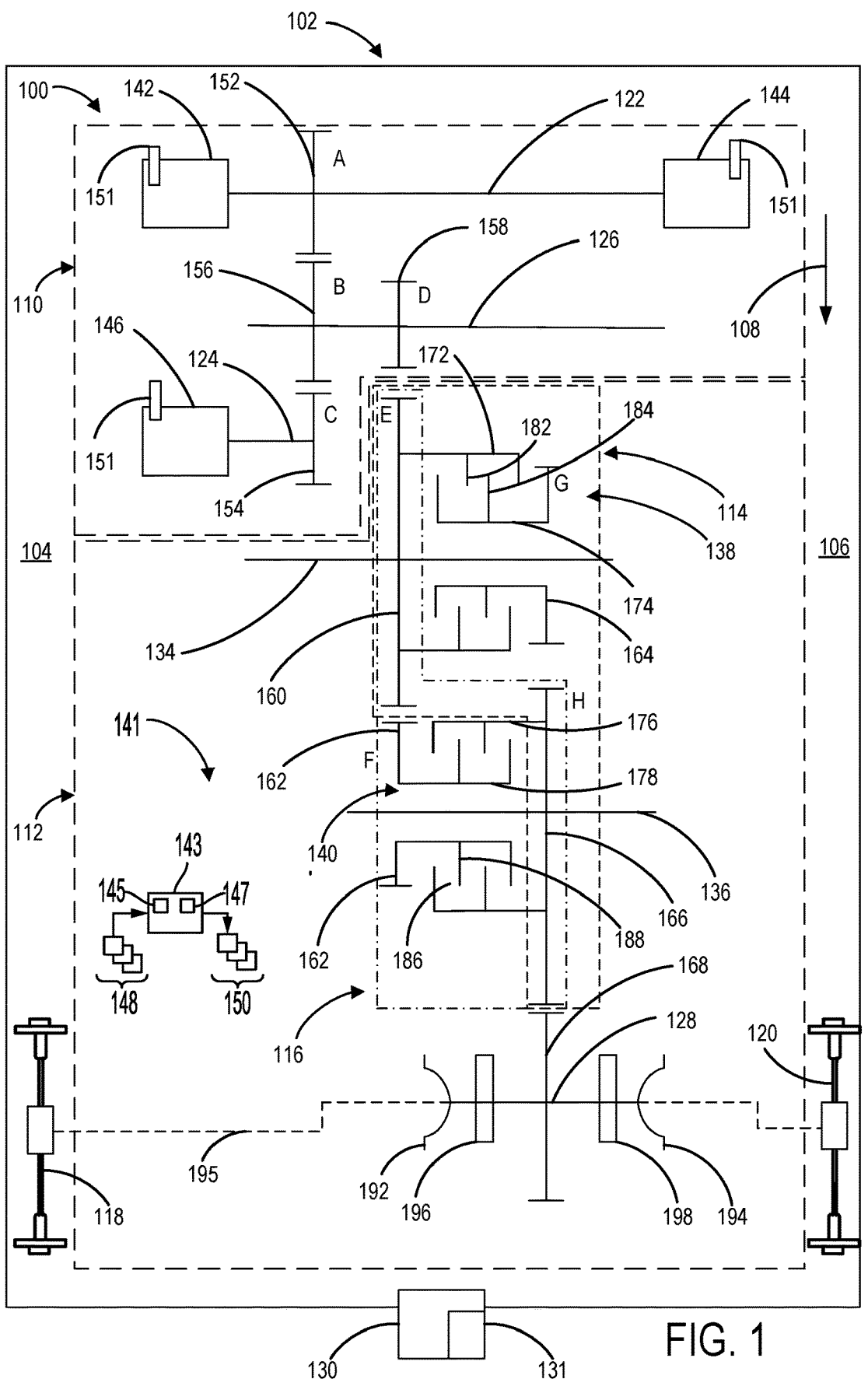
FIG. 1 schematically shows an assembly comprising three electric motors.
Figure 2A:
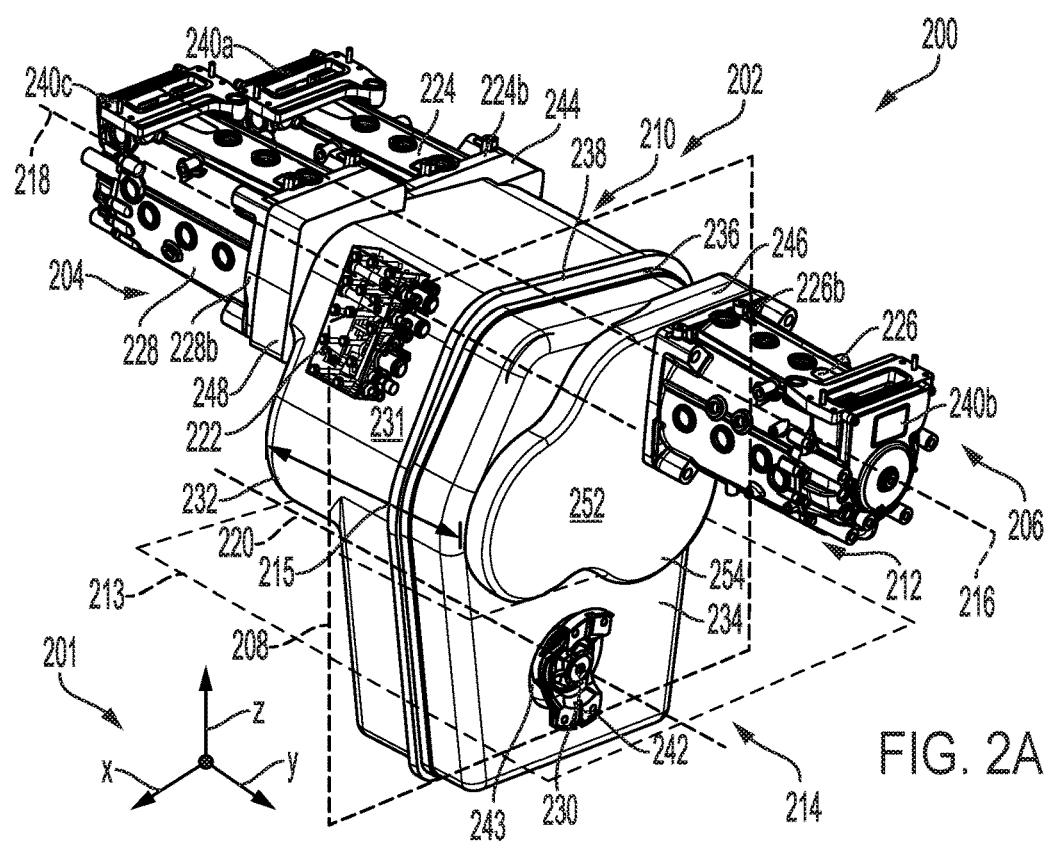
FIG. 2A shows a first perspective view of the assembly with the electric motors coupled thereto.
Figure 2B:
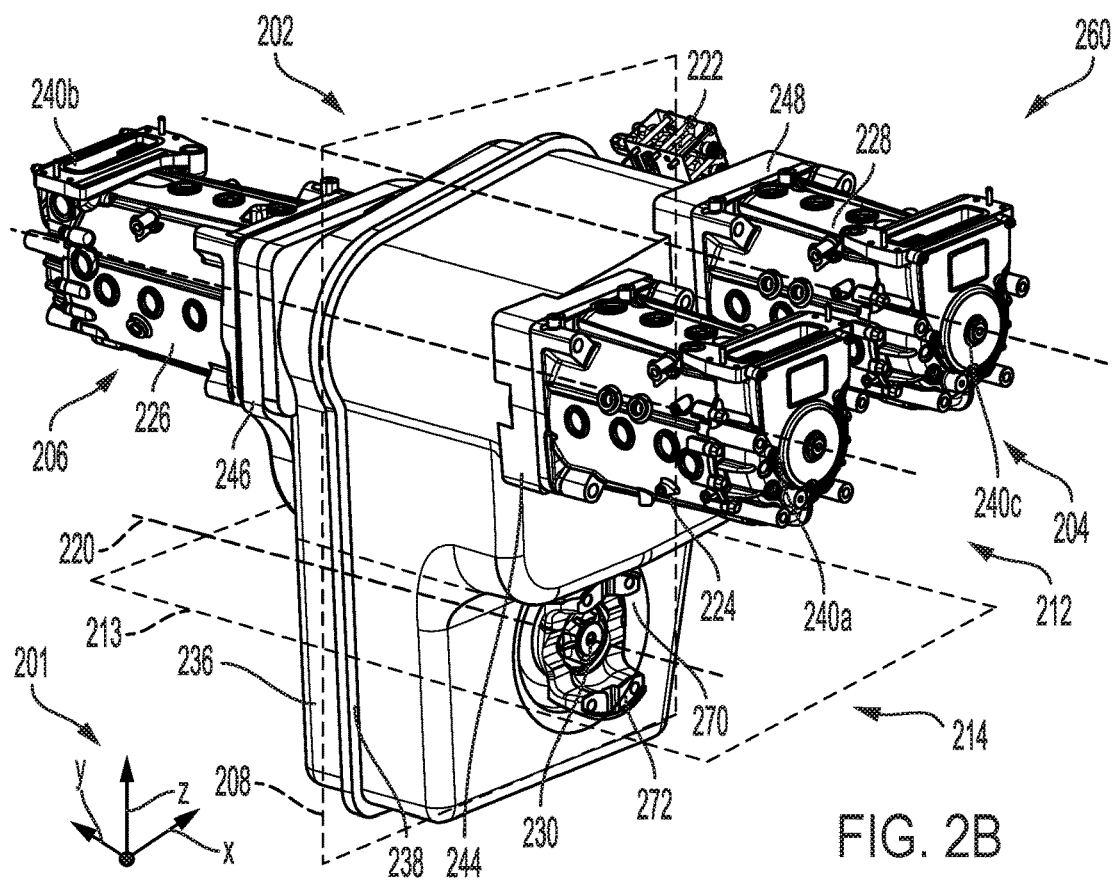
FIG. 2B shows a second perspective view of the assembly with the electric motors coupled thereto.

FIG. 1 schematically shows an assembly comprising three electric motors. The assembly in FIG. 1 is formed of two subassemblies, wherein a first subassembly contains the input shafts, idle shafts, the electric machines, and their respective gears of the shafts, and the second subassembly may be formed of intermediate shafts, output shafts, and their respective gears. FIG. 2A shows a first perspective view of the assembly with the electric motors coupled thereto. FIG. 2B shows a second perspective view of the assembly with the electric motors coupled thereto. The assembly in FIGS. 2A-B may be couple to three electric machines and may share internal features with the schematic shown in FIG. 1.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIG. 1 show schematics of example configurations with relative positioning of the various components. Herein, when the vehicle is positioned on level ground, vertical is shown with respect to gravity. FIGS. 2A-B are shown approximately to scale, although other relative dimensions may be used. As used herein, the terms "approximately" is construed to mean plus or minus five percent of the range unless otherwise specified.

Further, FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in a face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning now to FIG. 1, it shows an assembly 100 (e.g., an electric transmission) comprising a plurality of electric motors. An example embodiment of the assembly 100 is shown comprising three electric motors, and a first subassembly 110 comprising a first input shaft that is driven by two motors that are mounted opposite one another, a second input shaft driven by a third motor, an idler shaft positioned between the two input shafts. The first subassembly 110 may act as an input subassembly, wherein sources of power, such as a plurality of electric motors, are drivingly coupled are drivingly coupled to the assembly 100 via a plurality of inputs. The assembly 100 may be housed by and used to drive a vehicle 102.

Additionally, the assembly 100 comprises a two-speed transmission subassembly in the form of a second subassembly 112. The second subassembly 112 comprises a low-shaft to engage a first gear and/or clutch, and, a high-shaft to engage a second gear and/or clutch. The assembly further comprises a second subassembly comprising an output shaft, a gear, two bearings, and two output flanges. The second subassembly 112 may act as an output subassembly, wherein an output shaft may transfer rotation energy via torque to components drivingly coupled to the transmission assembly.

The second subassembly 112 forms at least two reduction sets, such as a first reduction set 114 and a second reduction set 116. The first reduction set 114 may be enclosed by a first set of dashed lines. The second reduction set 116 may be enclosed by a second set of dashed lines.

A first input shaft 122 may act as the first input shaft described above. A second input shaft 124 may act as the second input shaft described above. An idler shaft 126 may act as the idler shaft described above. The idler shaft 126 may have a plurality of gears coupled to reduction sets, allowing the idler shaft 126 to act as an idler gear shaft. An output shaft 128 may act as the output shaft described above.

A dry sump 130 may optionally be incorporated into the lowest point of the assembly 100 with respect to the direction 108 of gravity. The dry sump 130 may incorporate a pump 131, such as a scavenger pump, that may continuously remove lubricant used to lubricate the electric machines, shafts, gears, and clutches of the assembly 100. For one example, the dry sump 130 may be located below the output shaft 128.

Vehicle 102 may be capable of various applications and be of various configurations, including vehicles such as loaders, including backhoe, skid steer, dozer, and wheel loaders, as well as trucks. However, it is to be appreciated these examples are not limiting, and assembly 100 may function and be used for vehicle 102 of lighter configuration and/or with less of a utility function, such as a car, a van, or motorized cart. In some examples, vehicle 102 may be an at least partially electric vehicle, such as a hybrid vehicle, with multiple sources of torque available to one or more vehicle wheels. Vehicle wheels of vehicle 102 may be drivingly coupled to sources of torque via a first axle 118 and a second axle 120. For these examples, sources of power may include a combustion engine, an electric motor, and/or mechanical power from an occupant of the vehicle, but there may be least a single or plurality electric motors or electric machines to generate rotational energy for the wheels of the vehicle 102. In other examples, vehicle 102 may be an all-electric vehicle (EV), powered exclusively by an energy storage device such as a battery. If vehicle 102 is an all-electric vehicle, only electric machines or electric motors may generate rotational energy for the wheels, the first axle 118, and the second axle 120 of the vehicle 102. For one example the first axle 118 may be proximate to the front of vehicle 102 and may act as a front axle. For this example, the second axle 120 may be proximate to the rear of vehicle 102 and may act as a rear axle. It is to be appreciated the positions of the first axle 118 and second axle 120 may be non-limiting. Additionally, there may be other axles besides the first axle 118 and second axle 120.

A first clutch (e.g., a low clutch) is configured to engage with a first gear of a first shaft. A second clutch (e.g., a high clutch) may engage with a second gear of a second shaft. The first shaft and second shaft of the two speed transmission subassembly, may be a first shaft 134 and a second shaft 136, respectively. For one example, the first shaft 134 may be a low shaft, wherein the first shaft 134 rotates at a higher rotational speed and lower torque than second shaft 136. For this example, the second shaft 136 may be a high shaft, wherein the second shaft 136 rotates as a lower rotational speed and a higher torque than the first shaft 134.

The first reduction set 114 may be formed between the idler shaft 126, the first shaft 134, and their respective gears. The first reduction set 114 may also include gears that are or may be drivingly coupled to the second shaft 136. The second reduction set 116 may be formed between the idler shaft 126 and the second shaft 136. The second reduction set 116 may also include gears that are or may be drivingly coupled to the first shaft 134.

A first clutch 138 may drivingly couple the idle shaft to the first reduction set 114 to the idler shaft 126. A second clutch 140 may drivingly couple the idle shaft to the second reduction set to the idler shaft 126.

A first electric machine 142 may act as the first motor driving the first input shaft 122. A second electric machine 144 may act as the second motor driving the first input shaft 122. A third electric machine 146 may act as the third motor driving to second input shaft 124.

A control system 141 may be communicatively coupled to the first electric machine 142, second electric machine 144, and third electric machine 146. A control system 141 with a controller 143 may be incorporated into the assembly 100 and/or the vehicle 102. The controller 143 includes a processor 145 and memory 147. The memory 147 may hold instructions stored therein that when executed by the processor 145 cause the controller 143 to perform the various methods, control strategies, diagnostic techniques, etc., described herein. The processor 145 may include a microprocessor unit and/or other types of circuits. The memory 147 may include known data storage mediums such as random access memory, read only memory, keep alive memory, combinations thereof, etc. The memory 147 may include non-transitory memory.

The controller 143 may receive vehicle data and various signals from sensors positioned in different locations in the assembly 100 and/or the vehicle 102, indicated at 148. The sensors may include a plurality of motor speed sensors 151 and wheel speed sensors. The controller 143 may send control signals to controllable components, such as the electric machines, indicated at 150. The motor speed sensors may be used to monitor the rotational speed of the first electric machine 142, second electric machine 144, and third electric machine 146. For example, the controller 143 may send a signal to increase the rotational speed of first electric machine 142 when the vehicle slows due to friction and a similar input for speed is detected. For another example the controller 143 may shut off the first electric machine and/or start another electric machine such as the second electric machine 144 or third electric machine 146 when the vehicle 102 switches to a new mode, such as idle or reverse.

Two or more of the first electric machine 142, second electric machine 144, and third electric machine 146 work in conjunction to deliver rotational energy via torque to the idler shaft 126. The outputs of the first electric machine 142, second electric machine 144, and third electric machine may be set to rotate such that the torques provided do not cancel one another out and subtract from a net torque through the idler shaft. The torques may be additive and result increased net torque and speed to the idler shaft 126 compared to the torque and speed of the first input shaft 122 and second input shaft 124. Additionally, the first electric machine 142, second electric machine 144, and third electric machine 146 may be operated independently of one another and transfer torque individually to the idler shaft.

A plurality of gears may be used to drivingly couple, reduce the speed, and increase rotational energy via torque between first and second input shafts 122, 124 to the idler shaft 126. More specifically, the first input shaft 122 may include a first input gear (A) and the second input shaft 124 may include a second input gear (C). The first input gear (A) and the second input gear (C) may be selectively engaged to a first idler gear (B) of the idler shaft 126. As illustrated, the idler shaft 126 extends in a direction parallel to the first input shaft 122 and the second input shaft 124. A first gear 152 may act as the first input gear (A). A second gear 154 may act as the second input gear (C). A third gear 156 may act as the first idler gear (B). The third gear 156 may be positioned and drivingly coupled to the idler shaft 126.

The first gear 152 and third gear 156 may act as an input speed reducing gear set, wherein rotational speed, such as rotations per minute (RPM), is reduced and rotational power via torque is increased from an input. An input of speed reducing gear set formed of the first gear 152 and third gear 156 may be the input of the first or second electric machine 142, 144. Likewise, the second gear 154 and third gear 156 may act as an input speed reducing gear set. An input of the speed reducing gear set formed of second gear 154 and third gear 156 may be the input of the second electric machine 144.

The idler shaft 126 may be selectively coupled to one or more of a first shaft 134 (low) or a second shaft 136 (high). In one example, the first shaft 134 is a first speed shaft and the second shaft 136 is a second speed shaft configured to achieve different speeds. The rotational speed realized by the first shaft 134 may deliver a different torque to the output shaft 128 compared rotational speed realized by second shaft 136. For one example the first shaft 134 may realizes a first speed that is greater than the realized speed of the second shaft 136 from the same torque input delivered from the idler shaft 126.

The idler shaft 126 may include a second idler gear (D) configured to engage with a first speed shaft first gear (E) and/or a second speed shaft first gear (F). The first speed shaft and the second speed shaft may be optionally coupled to an output shaft gear (I) via a first speed shaft second gear (G) and a second speed shaft second gear (H). The first speed shaft second gear may be engaged or disengaged to the output shaft gear via the first clutch 138. The second speed shaft second gear may be engaged or disengaged to the output shaft gear via the second clutch 140. As such, the assembly may be a two-speed electric transmission (e-transmission). In particular, as detailed herein below, the transmission is a two-speed e-transmission comprising a countershaft configuration.

The output shaft gear may be coupled to an output shaft comprising only the output shaft gear, two bearings, and two flanges arranged in a housing of the transmission. The output shaft 128 may extend in a direction parallel to each of the first input shaft 122, the second input shaft 124, and the idler shaft 126. The output shaft 128 may have two outputs that may drivingly couple to rotating elements, such as the first axle 118 and the second axle 120. the output shaft 128 may couple to a front axle and/or a rear axle (e.g., to differentials thereof) to provide power to wheels of a vehicle, such as vehicle 102. Additionally or alternatively, the output shaft may output power to a loader or other device when actuation is desired.

A fourth gear 158 may act as the second idler gear (D). A fifth gear 160 and a sixth gear 162 may act as the first speed shaft first gear (E) and the second speed shaft first gear (F), respectively. A seventh gear 164 and an eighth gear 166 may act as the first speed shaft second gear (G) and the second gear shaft second gear (H), respectively. A ninth gear 168 may act as the output shaft gear (I).

The fifth gear 160, seventh gear 164, and eighth gear 166 may form the first reduction set 114 drivingly coupled to the first shaft 134. The fifth gear 160, sixth gear 162, and eighth gear 166 may form a second reduction set 116 coupled to the second shaft 136. For example, the effective diameter of a first ratio formed by the first reduction set 114 may be a lesser distance than effective diameter of a second ratio formed by the second reduction set 116. When the first clutch 138 drivingly couples the first reduction set 114 to the idler shaft 126, the sixth gear 162 may rotate freely under rotational energy transferred by the fifth gear 160. When the second clutch 140 drivingly couples the second reduction set 116 to the idler shaft 126, the seventh gear 164 may rotate freely under rotational energy transferred by the eighth gear 166.

Due to the increased transferred from the idler shaft to the first shaft and second shaft, the first clutch 138 and second clutches 140 may be wet clutches. Lubricant, such as oil, may remove buildup of thermal energy in components and reduce frictional forces placed on the first clutch 138 and second clutch 140.

The first clutch 138 may be comprised of a first locking component 172 and a second locking component 174. The first locking component 172 may be formed from or drivingly coupled to the fifth gear 160. The second locking component 174 may be formed from or drivingly coupled the seventh gear 164. The second clutch 140 may be comprised of a third locking component 176 and a fourth locking component 178. The fourth locking component 178 may be formed from or drivingly coupled to the sixth gear 162. The third locking component 176 may be formed from or drivingly coupled to the eighth gear 166.

The first locking component 172 may have a plurality of first engagements 182. The second locking component 174 may have a plurality of second engagements 184. The first engagements 182 may lock with the second engagements 184 to drivingly couple the first locking component 172 to the second locking component 174. When the first locking component 172 and second locking component 174 are drivingly coupled, the first clutch 138 may be locked. When the first clutch 138 is locked, the fifth gear 160 may be drivingly coupled to the seventh gear 164.

The third locking component 176 may have a plurality of third engagements 186. The fourth locking component 178 may have a plurality of fourth engagements 188. The third engagements 186 may lock with the fourth engagements 188 to drivingly couple the third locking component 176 to the fourth locking component 178. When the third locking component 176 and fourth locking component 178 are drivingly coupled, the second clutch 140 may be locked. When the second clutch 140 is locked, the fifth gear 160 and sixth gear 162 may be drivingly coupled to the eighth gear 166.

The first clutch 138 and second clutch 140 may be friction clutches that are wet clutches. For this example, the first locking component 172 and third locking component 176 may be flywheels. The first and third engagements 182, 186 may be clutch plates, such as friction plates. The second locking component 174 and fourth locking component 178 may be clutch disks. The second and fourth engagements 184, 188 may be clutch plates, such as friction plates.

A first flange 192 and/or a second flange 194 may be formed or drivingly coupled to opposite ends of the output shaft 128. The first flange 192 and/or second flange 194 may each drivingly couple the output shaft 128 to a shaft or a rotating component. The first flange 192 and/or second flange 194 may each drivingly couple the output shaft 128 to the first axle 118 or the second axle 120. For example, flange 192 may drivingly couple the output shaft 128 to the first axle 118 as represented by a plurality dashed lines 195. For this example, flange 194 may drivingly couple the output shaft 128 to the second axle 120 as represented by a plurality of dashed lines 195.

A first bearing 196 may support a section of the output shaft closest to the first flange 192 on one side of the ninth gear 168. A second bearing 198 may support a section of the output shaft closest to the second flange 194 on one side of the ninth gear 168. The first and second bearings 196, 198 may act as the at least two bearings supporting the output shaft 128.

A set of reference axes 201 are provided for comparison between views shown in FIG. 2A-B. The reference axes 201 indicate a y-axis, an x-axis, and a z-axis. In one example, the z-axis may be parallel with a direction of gravity and the x-y plane may be parallel with a horizontal plane that a transmission assembly 202 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

FIGS. 2A and 2B detail one embodiment of three electric motors equipped to a transmission assembly. As shown, two motors are arranged opposite one another. The two motors are connected via a first input shaft, and the third via a second input shaft. The three motors are connected together via an idler shaft.

Turning to FIG. 2A, it shows, a first view 200 of a transmission assembly 202 that may be or include the transmission described above. The first view 200 may be an isometric view, wherein no favoritism is shown the axes of the reference axes. The transmission assembly 202 may have a first side 204 and a second side 206 divided by a plane 208. The transmission assembly 202 may be enclosed by a transmission housing 210. Both the transmission assembly 202 and transmission housing 210 are asymmetrical. The transmission assembly 202 and transmission housing 210 may be divided into a top section 212 and a bottom section 214. The top section 212 may be greater in width 215 than the bottom section 214, giving the transmission assembly 202 and transmission housing 210 a t shape. The top section 212 is where the plurality of motors may couple.

In one example, an assembly includes a transmission comprising a countershaft layout. A plurality of axes may extend through the transmission assembly 202. For an example of one embodiment, there may be a first axis 216, a second axis 218, and a third axis 220 may extend through the assembly 202. The first axis 216, the second axis 218, and the third axis 220 may each be parallel with one another and with the y-axis. The first axis 216, the second axis 218, and the third axis 220 may be concentric to a shaft of the countershaft layout. The transmission may be coupled to a plurality of motors. Motors may be aligned, such that they may be centered about the first axis 216 and second axis 218.

In one example, the plurality of motors are electric motors. A first electric motor and a second electric motor may be arranged on a first side 104 of the transmission assembly 202 and a third electric motor may be arranged on a second side 106 of the transmission assembly 202. The first side 104 may be opposite the second side 106. The first electric motor may be configured to drive a first input shaft. A second input shaft may be driven by one or more of the second electric motor and the third electric motor. The three motor input arrangement of the transmission may result in a relatively small packaging size. The schematic of the assembly also shows the direction 108 of gravity, representing the directional force of gravity relative to the assembly 100 during operation.

For the example shown in first view 200, the top section 212 may be drivingly coupled to the first electric machine 224, a second electric machine 226, and a third electric machine 228. The electric machines may that may act as the motors described above. For this example, the first and third electric machines 224, 228 may act as the first and second motors, respectively, on the first side 104. The second electric machine 226 may act as the third motor on the second side 106 opposite the first side 104. The first and second electric machines 224, 226 may be aligned with the first axis 216, wherein the outputs of the first and second electric machines 224, 226 are approximately centered about the first axis 216. The third electric machine 228 may be aligned with the second axis 218, such that the output of the third electric machine 228 is approximately centered about the second axis 218. Additionally, the first electric machine 224, second electric machine 226, and third electric machine 228 may be the first electric machine 142, second electric machine 144, and the third electric machine 146, respectively, with reference to FIG. 1. The first electric machine 224, a second electric machine 226, and a third electric machine 228 may be of the same dimensions and be the same model and/or type of electric machine with approximately the same rotational power output.

An electronic component 222, which may be a controller with instructions for controlling the motors and clutches, may be coupled or fastened to a surface 231 of the housing 210. The surface 231 may be located between the first side 204 and the second side 206 of the transmission assembly 202.

An idler shaft may be coupled to the first input shaft and the second input shaft. The countershaft layout comprises a first shaft and a second shaft, each including corresponding gears and clutches. The first shaft may realize a first speed and the second shaft may realize a second speed.

The first input shaft, second input shaft, and idler shaft described above may be the first input shaft 122, second input shaft 124, and idler shaft 126 with reference to FIG. 1.

The first input shaft enclosed by the transmission housing 210 may be approximately centered about the first axis 216. The second input shaft enclosed by the transmission housing 210 may be approximately centered about the second axis 218. The top section 212 may house components of the first subassembly 110, such as the first input shaft 122, second input shaft 124, and idler shaft 126 and their respective gears with reference to FIG. 1.

Likewise, the first shaft and second shaft of different speeds that comprise the countershaft layout, may be the first shaft 134 and second shaft 136 with reference to FIG. 1. The first shaft and second shaft of different speeds may be approximately centered about axes that are parallel with first axis 216, second axis 218, and third axis 220. The bottom section 214 may house components of the second subassembly 112, such as the first shaft 134, the second shaft 136, the output shaft 128, and their respective gears and clutches with reference to FIG. 1. Additionally, for examples of other embodiments components of the second subassembly 112 such as the first shaft 134 and/or second shaft 136 may be fully or partially enclosed by the top section 212.

An output shaft may be arranged at a portion of the transmission opposite the input shafts. The output shaft may comprise one gear, two bearings, and two flanges. In one example, a flange-to-flange distance may be minimized to further decrease a packaging size of the transmission. In one example, the transmission is shaped to include a long drop (e.g., measured along a height of the transmission) and a short flange-to-flange distance (measured normal to the height). The long drop may be enclosed and formed by the bottom section 214 as the bottom section 214 extends downward from the top section 212.

Assembly 202 may have an output shaft 230. An output shaft 230 may be the output shaft described above and output shaft 128 with respect to FIG. 1. The output shaft 230 may be located in the bottom section 214 opposite to the first and second input shafts located in the top section 212. Output shaft 230 may be aligned with the third axis 220, such that output shaft 230 may be approximately centered on the third axis 220.

The aforementioned shafts may be enclosed by the housing 210. The housing 210 may be formed from a first portion 232 and a second portion 234. The first portion 232 may be on the first side 204 and the second portion 234 may be on the second side 206 of the transmission assembly 202. A first flange 236 may be formed on the first portion 232. A second flange 238 may be formed on the second portion 234. The first portion 232 and second portion 234 may be fastened, coupled, or joined at the first flange 236 and second flange 238 at a plane 208.

Output shaft 230 may be drivingly coupled to a flange 242 on the second side 206 of the transmission assembly 202. The flange 242 may be located radially about the output shaft 230 with respect to the third axis 220. The flange 242 may be the second flange 194, with reference to FIG. 1, and may be used to drivingly couple other shafts, reduction sets, or rotational elements. The flange 242 may spin about the third axis 220 and transfer rotational energy via torque with the output shaft 230. A first recess 243 may be formed on the second portion 234 and may be located radially about portions of the flange and output shaft 230, with respect to the third axis 220.

A first component 240*a*, a second component 240*b*, and a third component 240*c* may each be coupled to the first electric machine 224, second electric machine 226, and third electric machine 228, respectively. First electric machine 224 and third electric machine 228 may be joined or coupled to the first side 204 of the transmission assembly 202 via the first portion 232. The second electric machine 226 may be joined or coupled to the second side 206 of the transmission assembly 202 via the second portion 234. A first motor flange 244 and a third motor flange 248 may be formed from the first portion 232 that the first and third electric machines 224, 228 may be fastened or coupled to. Likewise, a second motor flange 246 may be formed from the second portion 234 that the second electric machine 226 may be fastened or coupled to. The first motor flange 244 may couple or fasten to a first base 224b of the first electric machine 224. The second motor flange 246 may couple or fasten to a second base 226b of the second electric machine 226. The third motor flange 248 may couple or fasten to a third base 228b of the third electric machine 228.

The second motor flange 246 may be formed from and be approximately coplanar with a surface 252. The surface 252 may be shaped to a perimeter of a hub 254. The hub 254 may have the shape of a plurality of overlapping circles, wherein the edges of the circles may be fused and beveled where the circumferences of the circles intersect. The hub 254 may enclose the ends of a plurality of shafts, such as the first input shaft 122, the second input shaft 124, and the idler shaft 126 with reference to FIG. 1.

Turning to FIG. 2B, it shows, a second view 260 of a transmission assembly 202 that may be or include the transmission described above. The second view 260 may be an isometric view, wherein no favoritism is shown the axes of the reference axes. The second view 260 is positioned opposite to the first view 200 of FIG. 2A, showing additional details on the first side 204 of the assembly 202. Output shaft 230 may be drivingly coupled to a flange 272 on the first side 204 of the transmission assembly 202. The flange 272 may be located radially about the output shaft 230 with respect to the third axis 220. The flange 272 may be first flange 192, with reference to FIG. 1, and may be used to drivingly couple other shafts, reduction sets, or rotational elements. The flange 272 may spin about the third axis 220 and transfer rotational energy via torque with the output shaft 230. A second recess 270 may be formed on the second portion 234. The second recess 270 may be located radially about portions of the flange and output shaft 230, with respect to the third axis 220.

In one example, efficiency may be increased to decrease an operating cost and increase a range of the vehicle. Three motors, such as the first electric machine the first electric machine 224, a second electric machine 226, and a third electric machine 228, may provide a determined amount of tractive power at stall to load a bucket of a loader, for example, and to provide an operator requested threshold top speed and speed on ramp. The transmission with three inputs via the two inputs enhances the configuration of the electric motors even when relatively high total power is demanded of the transmission. The electric motors may provide a low cost solution and a size of the electric motors may be relatively small.

This system may be used in many various applications including vehicles such as loaders, including backhoe, skid steer, dozer, and wheel loaders, as well as trucks. A ratio is generated between the electric motors and a first clutch of the first shaft, which an idler shaft in between, which may reduce a change in speed in wet clutches to a determined value, thereby decreasing a drag loss. In one example, the determined value is maximized to further decrease the drag loss.

In some examples, additionally or alternatively, a dry sump may be included in the assembly. The dry sump may mitigate and/or prevent splash losses. A lower point of the transmission housing (e.g., proximal to the output shaft) may be continuously pumped by the dry sump or a scavenger pump.

The disclosure also provides support for a system, comprising: a transmission comprising a first input shaft and a second input shaft, a first electric motor coupled to the first input shaft, and a second electric motor and a third electric motor coupled to the second input shaft, wherein the second electric motor is arranged on a first side of the transmission and the third electric motor is arranged on a second side of the transmission, the first side opposite the second side. In a first example of the system, the first electric motor is arranged on the first side. In a second example of the system, optionally including the first example, the system further comprises: an idler gear shaft coupling the first input shaft and the second input shaft. In a third example of the system, optionally including one or both of the first and second examples, the system further comprises: a first speed shaft configured to realize a first speed. In a fourth example of the system, optionally including one or more or each of the first through third examples, the system further comprises: a second speed shaft configured to realize a second speed. In a fifth example of the system, optionally including one or more or each of the first through fourth examples, the system further comprises: an idler gear shaft and a first speed shaft, wherein an input speed reducing gear set is positioned between the idler gear shaft and the first speed shaft. In a sixth example of the system, optionally including one or more or each of the first through fifth examples, the system further comprises: an output shaft coupled to a front axle and a rear axle.

The disclosure also provides support for a vehicle assembly, comprising: an input subassembly driven by a plurality of motors, the input subassembly further comprising: a first input shaft driven by a first motor, a second input shaft driven by a second motor and a third motor, the second motor and the third motor arranged on opposite sides of the vehicle assembly, and an idler shaft coupled to the first input shaft and the second input shaft. In a first example of the system, the system further comprises: a two-speed transmission subassembly comprising a first speed shaft coupled to a first gear and a first clutch, and a second speed shaft coupled to a second gear and a second clutch. In a second example of the system, optionally including the first example, the system further comprises: a two-speed transmission subassembly comprising a first speed shaft and a second speed shaft, wherein the first speed shaft realizes a first speed different than a second speed realized by the second speed shaft. In a third example of the system, optionally including one or both of the first and second examples, the system further comprises: an output subassembly comprising an output shaft coupled to one or more of a front axle and a rear axle of a vehicle in which the assembly is arranged. In a fourth example of the system, optionally including one or more or each of the first through third examples, the vehicle is an all-electric vehicle.

The disclosure also provides support for a system for a vehicle, the system comprising: a transmission, a plurality of electric motors mounted to the transmission, a first input shaft coupled to a first electric motor of the plurality of electric motors, a second input shaft coupled to a second electric motor and a third electric motor of the plurality of electric motors, wherein the second electric motor and the third electric motor are arranged on opposite sides of the transmission, and an idler shaft configured to receive outputs from the first input shaft and the second input shaft, the idler shaft configured to output to a first speed shaft and a second speed shaft. In a first example of the system, the system further comprises: an output shaft that includes one gear, two bearings, and two flanges, wherein the two flanges include a first flange configured to couple to a first axle of the vehicle and a second flange configured to couple to a second axle of the vehicle. In a second example of the system, optionally including the first example, the vehicle is an all-electric vehicle or a hybrid vehicle. In a third example of the system, optionally including one or both of the first and second examples, the second electric motor and the third electric motor are coupled to opposite ends of the second input shaft. In a fourth example of the system, optionally including one or more or each of the first through third examples, the transmission is an e-transmission comprising a countershaft configuration. In a fifth example of the system, optionally including one or more or each of the first through fourth examples, the system further comprises: a housing of the transmission, wherein the first input shaft, the second input shaft, and the idler shaft are positioned in the housing of the transmission. In a sixth example of the system, optionally including one or more or each of the first through fifth examples, the first input shaft is configured to engage a first gear, and wherein the second input shaft is configured to engage a second gear. In a seventh example of the system, optionally including one or more or each of the first through sixth examples, the first input shaft is configured to engage a first clutch, and wherein the second input shaft is configured to engage a second clutch.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2A and 2B are shown approximately to scale.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a transmission comprising a first input shaft and a second input shaft;
a first electric motor coupled to the first input shaft;
a second electric motor and a third electric motor each directly coupled to the second input shaft, wherein the second input shaft is a continuous shaft between the second and third electric motors, and wherein the second electric motor is arranged on a first side of the transmission and the third electric motor is arranged on a second side of the transmission, the first side opposite the second side; and
an idler gear shaft coupling the first input shaft and the second input shaft, the idler shaft offset from each axis of the first, second, and third electric motors.

2. The system of claim 1, wherein the first electric motor is arranged on the first side.

3. The system of claim 1, further comprising a first speed shaft configured to realize a first speed.

4. The system of claim 1, further comprising a second speed shaft configured to realize a second speed.

5. The system of claim 1, further comprising an idler gear shaft and a first speed shaft, wherein an input speed reducing gear set is positioned between the idler gear shaft and the first speed shaft.

6. The system of claim 1, further comprising an output shaft coupled to a front axle and a rear axle.

7. A vehicle assembly, comprising:

an input subassembly driven by a plurality of motors, the input subassembly further comprising:

a first input shaft driven by a first motor;

a second input shaft driven by and directly coupled to a second motor and a third motor, the second motor and the third motor arranged on opposite sides of the vehicle assembly, wherein the second input shaft is a continuous shaft between the second and third electric motors; and an idler shaft coupled to the first input shaft and the second input shaft, wherein the idler shaft is offset from each axis of the first, second, and third electric motors.

8. The vehicle assembly of claim 7, further comprising a two-speed transmission subassembly comprising a first speed shaft coupled to a first gear and a first clutch, and a second speed shaft coupled to a second gear and a second clutch.

9. The vehicle assembly of claim 7, further comprising a two-speed transmission subassembly comprising a first speed shaft and a second speed shaft, wherein the first speed shaft realizes a first speed different than a second speed realized by the second speed shaft.

10. The vehicle assembly of claim 7, further comprising an output subassembly comprising an output shaft coupled to one or more of a front axle and a rear axle of a vehicle in which the vehicle assembly is arranged.

11. The vehicle assembly of claim 7, wherein the vehicle is an all-electric vehicle.

12. A system for a vehicle, the system comprising:

a transmission;

a plurality of electric motors mounted to the transmission;

a first input shaft coupled to a first electric motor of the plurality of electric motors;

a second input shaft coupled to a second electric motor and a third electric motor of the plurality of electric motors, wherein the second electric motor and the third electric motor are arranged on opposite sides of the transmission; and an idler shaft having an axis that is offset from an axis of each of the first electric machine, the second electric machine, and the third electric machine, and configured to receive outputs from the first input shaft and the second input shaft, the idler shaft configured to output to a first speed shaft and a second speed shaft.

13. The system of claim 12, further comprising an output shaft that includes one gear, two bearings, and two flanges, wherein the two flanges include a first flange configured to couple to a first axle of the vehicle and a second flange configured to couple to a second axle of the vehicle.

14. The system of claim 12, wherein the vehicle is an all-electric vehicle or a hybrid vehicle.

15. The system of claim 12, wherein the second electric motor and the third electric motor are coupled to opposite ends of the second input shaft.

16. The system of claim 12, wherein the transmission is an e-transmission comprising a countershaft configuration.

17. The system of claim 12, further comprising a housing of the transmission, wherein the first input shaft, the second input shaft, and the idler shaft are positioned in the housing of the transmission, and wherein the idler shaft is positioned vertically above the first electric machine and below the second electric machine and the third electric machine with respect to gravity as positioned in the housing.

18. The system of claim 12, wherein the first input shaft is configured to engage a first gear, and wherein the second input shaft is configured to engage a second gear.

19. The system of claim 12, wherein the first input shaft is configured to engage a first clutch, and wherein the second input shaft is configured to engage a second clutch.

* * * * *